(12) United States Patent
Han et al.

(10) Patent No.: US 12,348,255 B2
(45) Date of Patent: Jul. 1, 2025

(54) ADAPTIVE ANTENNA TUNING SYSTEM

(71) Applicant: Apple Inc., Cupertino, CA (US)

(72) Inventors: Liang Han, Sunnyvale, CA (US); Enrique Ayala Vazquez, Watsonville, CA (US); Thomas E. Biedka, San Jose, CA (US); Hongfei Hu, Cupertino, CA (US); Erdinc Irci, Sunnyvale, CA (US); Nanbo Jin, San Jose, CA (US); James G. Judkins, Campbell, CA (US); Victor C. Lee, Santa Clara, CA (US); Matthew A. Mow, Los Altos, CA (US); Mattia Pascolini, San Francisco, CA (US); Ming-Ju Tsai, Sunnyvale, CA (US); Yiren Wang, Cupertino, CA (US); Yuancheng Xu, San Jose, CA (US); Yijun Zhou, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/158,441

(22) Filed: Jan. 23, 2023

(65) Prior Publication Data

US 2023/0170927 A1    Jun. 1, 2023

Related U.S. Application Data

(63) Continuation of application No. 16/898,069, filed on Jun. 10, 2020, now Pat. No. 11,569,858.

(60) Provisional application No. 62/960,500, filed on Jan. 13, 2020.

(51) Int. Cl.
*H04B 1/38*       (2015.01)
*H01Q 23/00*     (2006.01)

(52) U.S. Cl.
CPC .............. *H04B 1/38* (2013.01); *H01Q 23/00* (2013.01)

(58) Field of Classification Search
CPC ................................ H04B 1/38; H01Q 23/00
See application file for complete search history.

(56) References Cited

U.S. PATENT DOCUMENTS

| | | |
|---|---|---|
| 9,473,216 B2 | 10/2016 | Mendolia |
| 10,158,174 B2 | 12/2018 | O'Driscoll |
| 10,177,744 B2 | 1/2019 | Tenbroek et al. |
| 10,312,582 B2 | 6/2019 | Shi et al. |

(Continued)

*Primary Examiner* — Junpeng Chen
(74) *Attorney, Agent, or Firm* — FLETCHER YODER PC (57) ABSTRACT

A radio frequency device has a multifunctional tuner that stores measurements of reflection coefficient parameter in a register. The radio frequency device also has a transceiver that has a transmitter. The transceiver may detect a transmitter signal from the transmitter to an antenna in an initial tuning state and then determine whether the transmitter signal is stable. In response to the transmitter signal being stable, the transceiver may measuring the reflection coefficient parameters at the multifunctional tuner. Furthermore, the radio frequency device has a baseband controller that has a memory to store instructions and a processor to execute the instructions. The instructions cause the processor to determine an antenna impedance based on the reflection coefficient parameters, and in response to determining that the antenna impedance is greater than or less than a threshold antenna impedance, iteratively tune the antenna using the multifunctional tuner.

20 Claims, 6 Drawing Sheets

(56) References Cited

U.S. PATENT DOCUMENTS

| | | |
|---|---|---|
| 10,355,662 B2 | 7/2019 | Backes et al. |
| 2011/0116423 A1 | 5/2011 | Rousu et al. |
| 2012/0112852 A1* | 5/2012 | Manssen ................ H04B 17/12 |
| | | 333/112 |
| 2013/0052967 A1* | 2/2013 | Black .................. H04B 1/0458 |
| | | 455/77 |
| 2015/0133066 A1* | 5/2015 | Zhu ...................... H01Q 9/0442 |
| | | 455/78 |
| 2016/0126904 A1 | 5/2016 | Kuo et al. |
| 2016/0294052 A1 | 10/2016 | Baek et al. |
| 2016/0294490 A1 | 10/2016 | Zhou et al. |
| 2017/0264010 A1 | 9/2017 | Shi |
| 2018/0242334 A1 | 8/2018 | Kim et al. |
| 2018/0248634 A1 | 8/2018 | Pascolini et al. |
| 2018/0342794 A1* | 11/2018 | Han ........................ H04B 1/18 |
| 2019/0067785 A1 | 2/2019 | Messina |
| 2019/0150003 A1 | 5/2019 | He et al. |
| 2019/0268954 A1 | 8/2019 | Yu et al. |
| 2020/0007092 A1 | 1/2020 | Wang et al. |
| 2020/0088773 A1 | 3/2020 | Solomko et al. |
| 2020/0345274 A1* | 11/2020 | Ghoshal ............... A61B 5/1135 |
| 2021/0036722 A1 | 2/2021 | Lim et al. |
| 2021/0075461 A1 | 3/2021 | Lei |

* cited by examiner

ADAPTIVE ANTENNA TUNING SYSTEM

CROSS-REFERENCE TO RELATED APPLICATIONS

This application is a continuation of and claims priority to U.S. patent application Ser. No. 16/898,069 filed on Jun. 10, 2020, entitled "Adaptive Antenna Tuning System," and issuing as U.S. Pat. No. 11,569,858 on Jan. 31, 2023, which claims priority to and the benefit of U.S. Provisional Application No. 62/960,500, filed Jan. 13, 2020, entitled "Adaptive Antenna Tuning System," each of which is hereby incorporated by reference in its entirety for all purposes.

BACKGROUND

The present disclosure relates generally to wireless communication systems and devices and, more specifically, to tuning an antenna of a wireless communication device based on impedance of the antenna for better performance.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many radio frequency (RF) transceiver devices are programmed to communicate on a range of frequencies and may be tuned to communicate on a particular frequency band. However, operating conditions of a device in varying conditions may impact device performance. For example, the device may communicate wireless signals less effectively in response to particular indoor or outdoor conditions, a device enclosure (e.g., cover) or type of enclosure (e.g., based on shape, dimension, material), a manner in which the device is used (e.g., hand covering an antenna of the device), and so forth.

Various antenna tuning techniques may be used to adjust antenna performance in these varying conditions to better send and receive wireless communications, such as without perceivable interference. In particular, antenna tuning techniques may rely on accurately determining impedance of the antenna located on an antenna reference plane of a transceiver device. To measure the antenna impedance, the transceiver device may measure a forward traveling signal and a reverse traveling signal of a transmitter signal. The ratio of these two signals represents a reflection coefficient which may indicate the antenna impedance.

However, the transceiver device may measure these signals at a coupler located on a reference plane that is different than a reference plane with the antenna. A reference plane may refer to a layer or a portion of a printed circuit board of the device on which a component is located. For example, the coupler may be located on a main logic board reference plane (e.g., a first layer or portion of the printed circuit board) while the antenna is located on an antenna reference plane (e.g., a second and different layer or portion of the printed circuit board). Moreover, circuitry and additional components may exist between the main logic board reference plane and the antenna reference plane. Since the forward traveling signal and the reverse traveling signal are not measured on the same reference plane as the antenna, the measurements may not be a direct translation of antenna performance. Thus, it may be difficult to accurately characterize antenna performance to tune accordingly.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to systems and devices for precisely characterizing an antenna of a radio frequency device during wireless communications and correspondingly tuning the antenna. In particular, a multifunctional tuner may allow measuring and tuning using the same tuner. Measuring the impedance of the antenna may include a transceiver of the radio frequency device detecting transmission of a transmitter signal from a transmitter to the antenna in an initial tuning state (e.g., default tuning or no tuning). Upon detecting the transmitter signal, the transceiver may determine whether the transmitter signal is stable.

In some embodiments, the transceiver may command the multifunctional tuner to measure reflection coefficient parameters after determining that the transmitter signal is stable. Reflection coefficient parameters may include a magnitude and/or a phase of a forward traveling signal and a reverse traveling signal of the transmitter signal. A ratio of these measurements may be used to determine a reflection coefficient, which may represent an antenna impedance. In another embodiment, the multifunctional tuner may automatically detect (e.g., via radio frequency pulse detection) the transmitter signal and measure the reflection coefficient parameters without waiting for a command from the transceiver.

After reflection coefficient parameters are measured by the multifunctional tuner, the antenna may be tuned based on the reflection coefficient. The transceiver may send the reflection coefficient parameters measured by the multifunctional tuner to a baseband controller of the device that may determine the reflection coefficient, and thus, the impedance of the antenna. In certain circumstances, such as when the impedance is not measured, the transceiver may send a tuning signal to the multifunctional tuner to tune the antenna to a predefined tuning (e.g., rather than sending the measurements to the baseband controller to determine the tuning state).

After determining the antenna impedance, the baseband controller may maintain the present tuning state of the antenna when the impedance is within a threshold, indicating that the antenna impedance matches a transmission line impedance. The threshold impedance may allow the antenna to transmit the transmitter signal with a predefined power that provides reliable or expected quality of wireless communication. On the other hand, if the impedance is not within the threshold impedance, the baseband controller may iteratively tune the antenna until the antenna impedance is within the threshold impedance.

In some embodiments, the tuning states may be associated with a tuning amount for the particular device and/or device condition, such as for an indoor and/or outdoor condition, a presence of an enclosure (e.g., cover) or type of enclosure (e.g., based on shape, dimension, material), and/or a manner of usage (e.g., a hand covering a portion of the antenna of the device). As such, the multifunctional tuner may be used to measure impedance of the antenna and/or to tune the antenna accordingly. Moreover, the antenna tuning may be adaptive, in that determining the tuning state may be performed in real time as the device is used in different manners.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
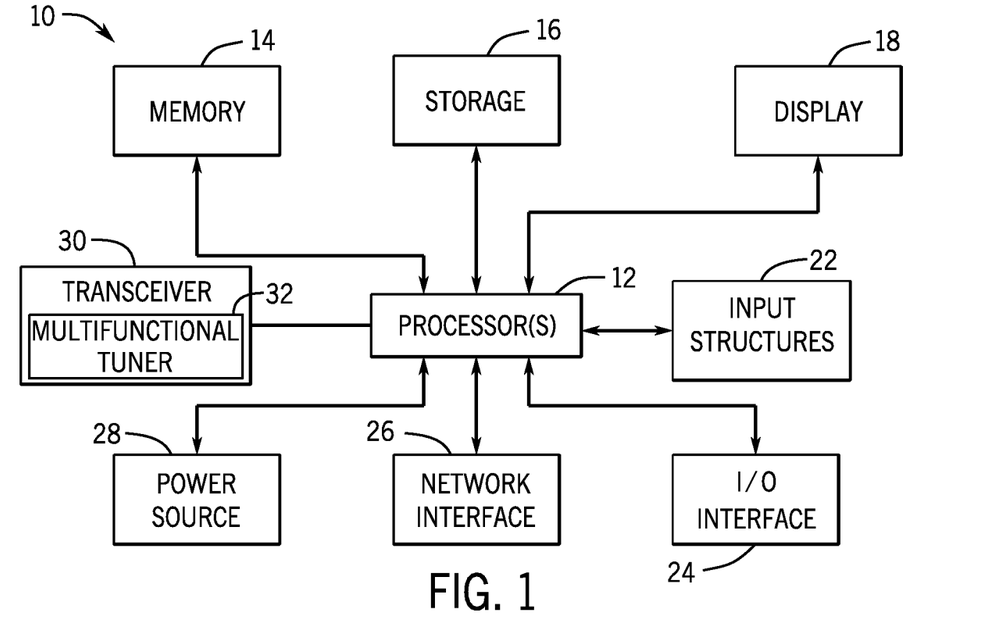
FIG. 1 is a block diagram of an electronic device, according to an embodiment of the present disclosure.

As previously discussed, measuring reflection coefficient parameters at a coupler that is not located on the same reference plane as the antenna (e.g., an antenna reference plane), may result in inaccurate measurements. Thus, determining an antenna impedance based on the reflection coefficient parameters to characterize antenna performance may also be inaccurate. Accordingly, the multifunctional tuner that is located on the antenna reference plane (e.g., share or have a common reference plane) may provide relatively more precise measurements of the reflection coefficient parameters. With the foregoing in mind, there are many suitable communication devices that may benefit from the embodiments for performing antenna impedance determinations and antenna tuning using a multifunctional tuner as described herein. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a power source 28, a transceiver 30, and a multifunctional tuner 32 of the transceiver 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
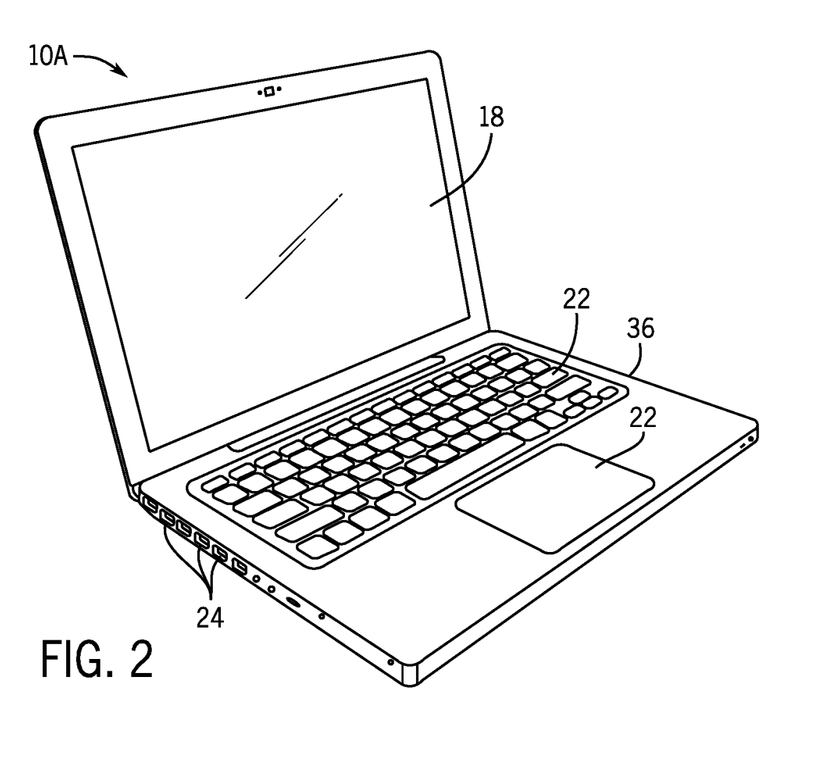
FIG. 2 is a perspective view of a notebook computer representing an embodiment of the electronic device of FIG. 1.
Figure 3:
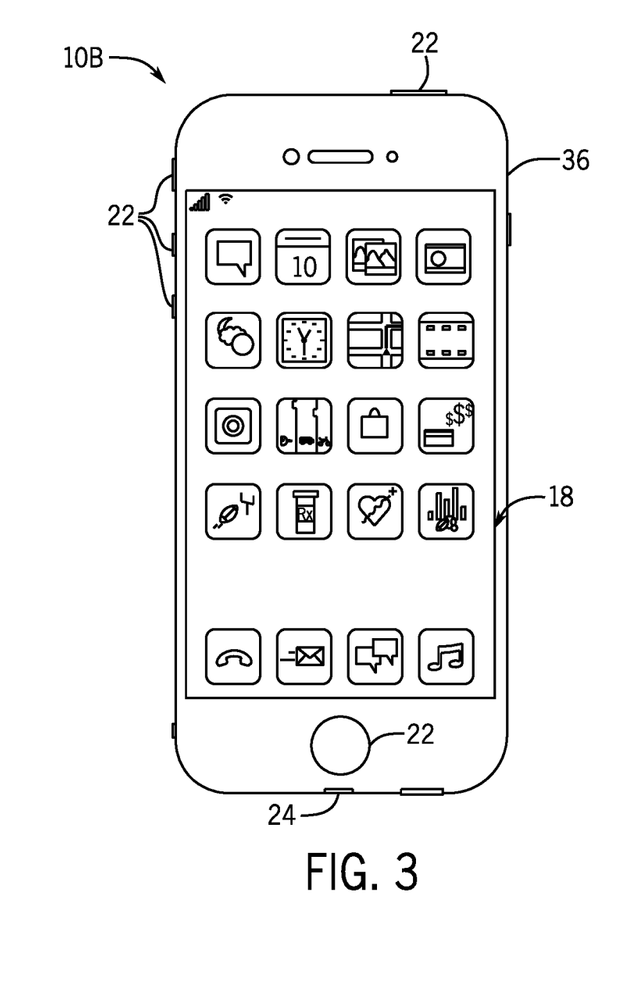
FIG. 3 is a front view of a handheld device representing another embodiment of the electronic device of FIG. 1.
Figure 4:
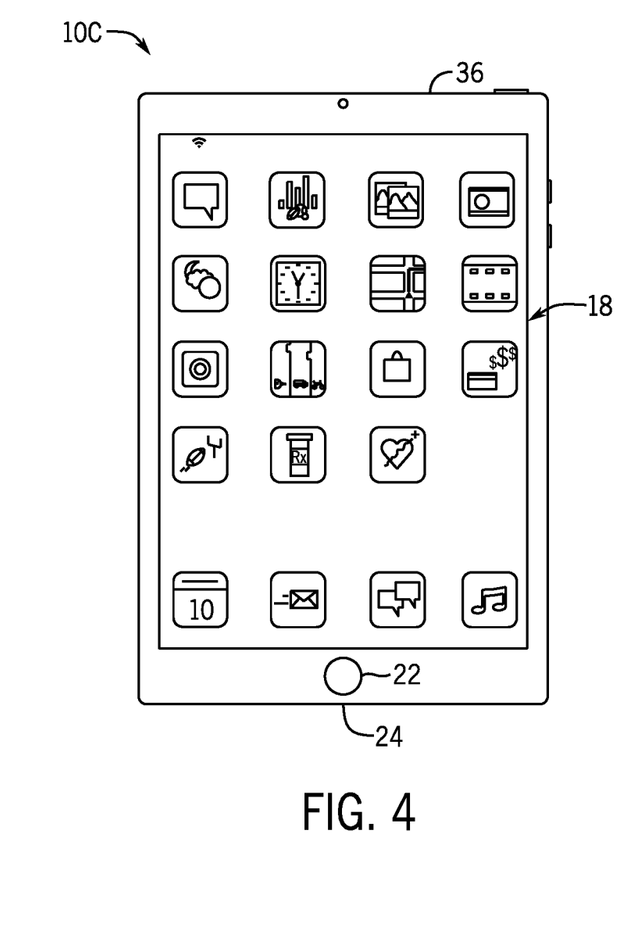
FIG. 4 is a front view of another handheld device representing another embodiment of the electronic device of FIG. 1.
Figure 5:
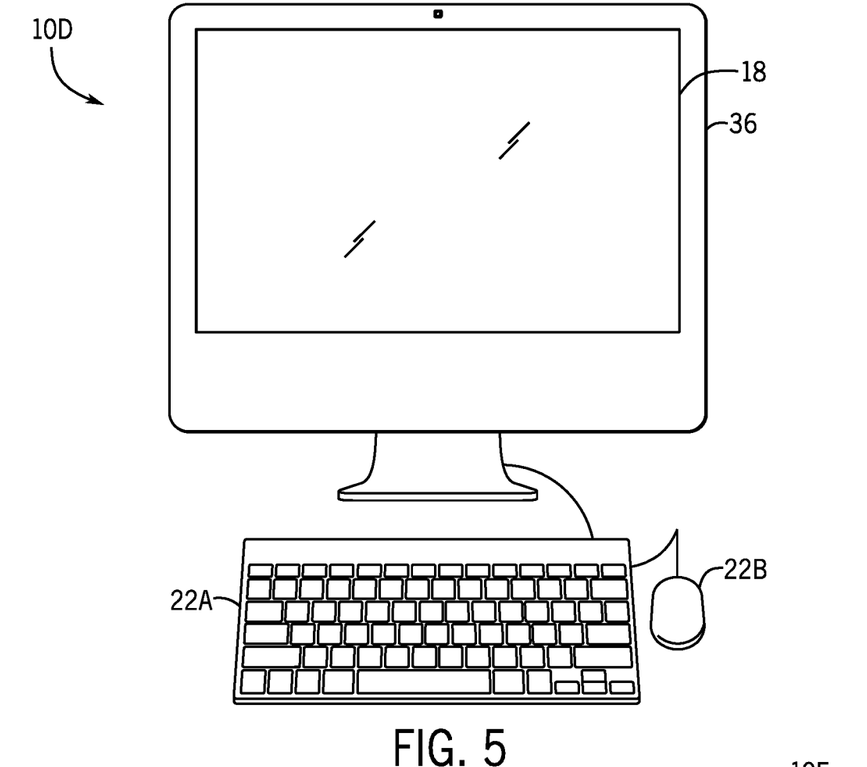
FIG. 5 is a front view of a desktop computer representing another embodiment of the electronic device of FIG. 1.
Figure 6:
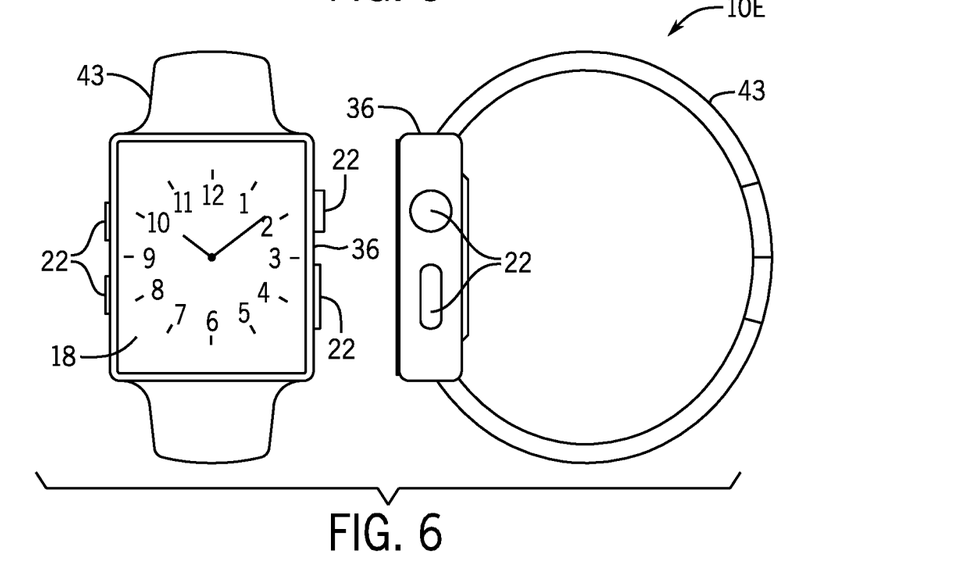
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be embodied wholly or in part as software, software, hardware, or any combination thereof. Furthermore, the processor(s) 12 and other related items in FIG. 1 may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor(s) 12 to enable the electronic device 10 to provide various functionalities.

For example, threshold impedance, tuning algorithms, tuning states, and/or measured antenna impedance may be saved in the memory 14 and/or nonvolatile storage 16. The antenna impedance (e.g., threshold and/or measured impedance) may indicate a measure of power that is delivered to an antenna to transmit a transmitter signal. As will be discussed in detail with respect to FIG. 9, to determine the tuning amount for the antenna, the device 10 may reference the threshold impedance. For example, by default and/or based on the measured impedance, the device 10 may tune the antenna to an initial state of tuning states using the multifunctional tuner 32. During transmission of the transmitter signal, the multifunctional tuner 32 may measure reflection coefficient parameters that may be used to determine the antenna impedance. Based on the impedance being within the threshold impedance, the device 10 may maintain the tuning state. Alternatively, if the impedance is not within the threshold impedance, then the device 10 may tune the antenna, such as by tuning to a different tuning state using the multifunctional tuner 32.

The threshold impedance may include a value (e.g., 50 ohms) or range (e.g., 30 ohms to 77.5 ohms) of values that allow the antenna to transmit the transmitter signal with a predefined power that provides reliable or expected quality of wireless communication. In some embodiments, the tuning states may be associated with a tuning amount for the particular device 10 and/or device 10 condition, such as for an indoor and/or outdoor condition, an enclosure (e.g., cover) or type of enclosure (e.g., based on shape, dimension, material), and/or a manner of usage (e.g., a hand covering a portion of the antenna of the device 10).

By way of example, a first tuning state may allow the antenna to transmit the transmitter signal within a predefined power threshold for when the antenna is completely uncovered, a second tuning state may allow the antenna to transmit the transmitter signal within a predefined power threshold when the antenna is partially covered (e.g., less than half of the antenna), a third tuning state may allow the antenna to transmit the transmitter signal within a predefined power threshold when the antenna is heavily covered (e.g., more than half of the antenna), a fourth tuning state may allow the antenna to transmit the transmitter signal within a predefined power threshold for when the device 10 is completely covered, and so forth. Thus, if the measured impedance is below the threshold impedance due to the antenna being completely covered, tuning the antenna to the fourth tuning state may adjust antenna parameters so that the impedance is within the threshold impedance, indicating that the antenna is transmitting the transmitter signal with sufficient power (e.g., within the predefined power threshold) to provide wireless communications as expected.

The threshold impedance and/or tuning parameters associated with each tuning state may be determined during factory setup and/or prior to commercial use (e.g., prior to testing conducted by technical support during consumer use). The threshold impedance may be set to a level that does not cause perceivable interference, such that normal communication between electronic devices 10 are not interrupted (e.g., streaming a video on a mobile electronic device 10 without perceivable data buffering). For example, the threshold impedance may be associated with a power level (e.g., gain range) for transmitting the transmitter signal. In some embodiments, such as when multiple antennas may transmit one or more transmitter signals, the threshold impedance for each of the antennas may be stored. Thus, a threshold impedance may be stored for each of the antennas and/or for each tuning state in the memory 14 and/or nonvolatile storage 16. Referencing these stored values, the processor 12 may execute a software or program also stored on the memory 14 and/or nonvolatile storage 16 to determine whether an impedance measured in real time for a particular antenna is within the respective threshold impedance.

In certain embodiments, the display 18 may be a light-emitting diode (LED) display (e.g., an organic light-emitting diode (OLED) display), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more liquid crystal displays (LCDs), or some combination of LCD, LED, and/or OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a 3rd generation (3G) cellular network, universal mobile telecommunication system (UMTS), 4th generation (4G) cellular network, long term evolution (LTE) cellular network, long term evolution license assisted access (LTE-LAA) cellular network, 5th generation (5G) cellular network, and/or 5G New Radio (5G NR) cellular network. In particular, the network interface 26 may include, for example, one or more interfaces for using a Release-15 cellular communication standard of the 5G specifications that include the millimeter wave (mmWave) frequency range (e.g., 24.25-300 GHz). The transceiver 30 of the electronic device 10, which includes a transmitter and a receiver, may allow communication over the aforementioned networks (e.g., 5G, Wi-Fi, LTE-LAA, and so forth).

The network interface 26 may also include one or more interfaces, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth. As further illustrated, the electronic device 10 may include a power source 28. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a graphical user interface (GUI) or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, California. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol.

User input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone that may obtain a user's voice for various voice-related features, and a speaker that may enable audio playback and/or certain phone capabilities. The input structures 22 may also include a headphone input that may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, California.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D, such as the display 18. In certain embodiments, a user of the computer 10D may interact with the computer 10D using various peripheral input structures 22, such as the keyboard 22A or mouse 22B, which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
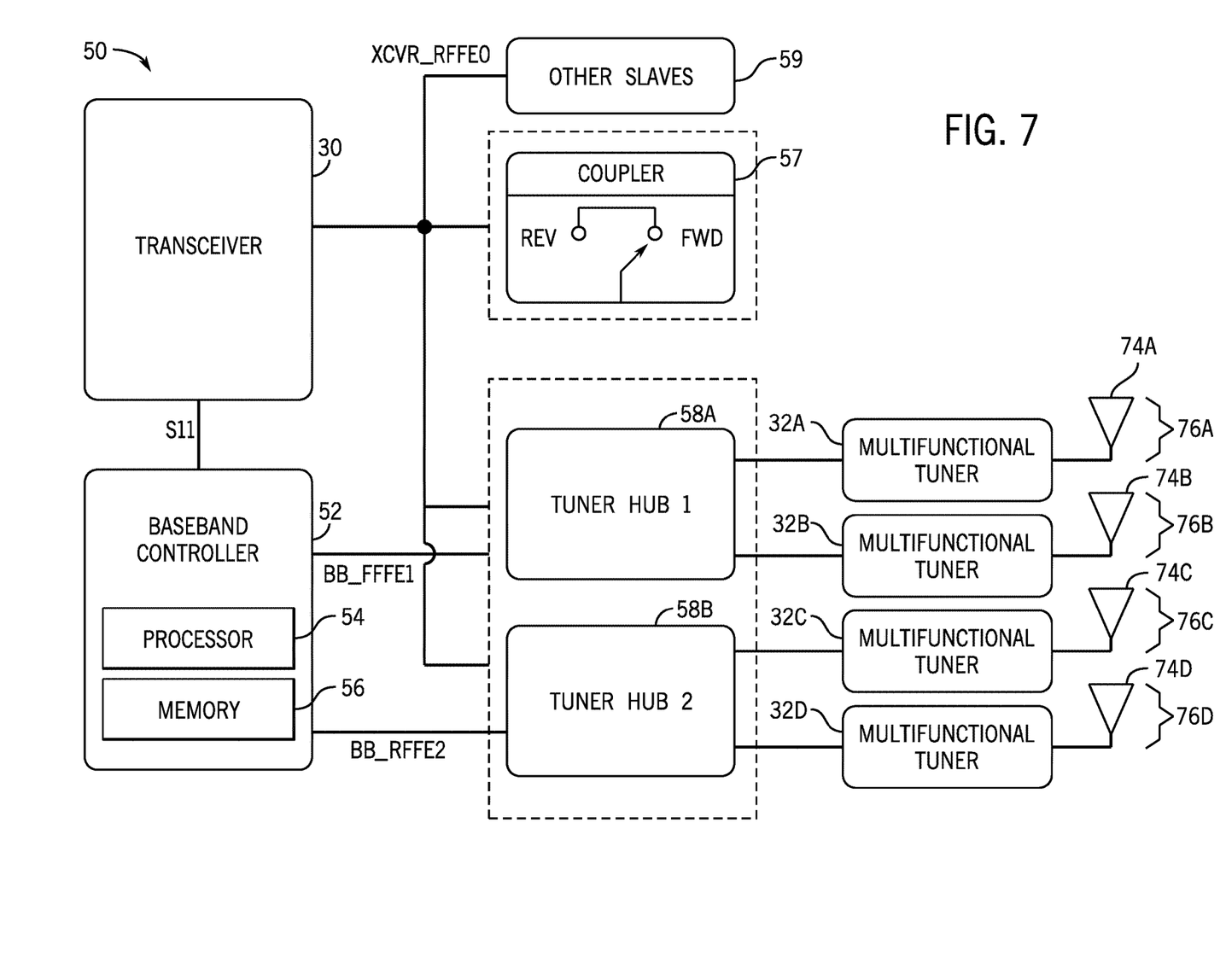
FIG. 7 is a block diagram of a radio frequency integrated circuit of the electronic device 10 of FIG. 1, in accordance with an embodiment of the present disclosure.

With the foregoing in mind, FIG. 7 is block diagram of a radio frequency integrated circuit 50 of the electronic device 10 of FIG. 1, according to embodiments of the present disclosure. In some embodiments, the radio frequency integrated circuit 50 may communicate with, be coupled to, or be integrated into the transceiver 30 of the electronic device 10 to facilitate transmitting and receiving signals. The transceiver 30 may communicate with a baseband controller 52, a coupler 57, tuner hubs 58, and/or other slave devices 59. The transceiver 30 and baseband controller 52 may communicate with transmitter chains 76, which may include multifunctional tuners 32 and antennas 74. Although the depicted embodiment illustrates a first tuner hub 58A (tuner hub 1) and a second tuner hub 58B (tuner hub 2) (e.g., tuner hubs 58), multiple transmitter chains 76 (e.g., transmitter chains 76A-D) with respective multifunctional tuners 32 (e.g., multifunctional tuners 32A-D) and multiple respective antennas 74 (e.g., antennas 74A-D), it should be noted that the methods and systems described herein may also be performed and implemented with any suitable combination and/or number of the depicted transmitter chains 76, the depicted tuner hubs 58, the multifunctional tuners 32, and the depicted antennas 74. By way of example, the first tuner hub 58A may communicate with each of the depicted multifunctional tuners 32 rather than the depicted half of the multifunctional tuner 32A and 32B. In some embodiments, as will be discussed herein, the methods and systems may also be performed and implemented without any tuner hubs 58 or the coupler 57, and/or include one or more single-function tuners (e.g., in addition or alternative to the one or more multifunction tuners 32).

To determine impedance of an antenna 74 in a respective transmitter chain 76, the transceiver 30 and/or the baseband controller 52 may send a signal to the multifunctional tuner 34 to measure the reflection coefficient parameters, which may be used to calculate the reflection coefficient that indicates the antenna impedance. In general, the adaptive tuning systems and methods provided by the multifunctional tuner described herein may relate to the reflection coefficient and/or a voltage standing wave ratio (VSWR), which is a function of the reflection coefficient. The reflection coefficient, s11 or Γ, indicates how much of an electromagnetic wave is reflected by an impedance discontinuity in the transmission medium. The reflection coefficient is determined by a ratio of the amplitude of a reflected wave to an incident wave at a reference plane (e.g., a forward traveling signal and a reverse traveling signal of a transmitter signal). The reflection coefficient parameters may include, but are not limited to, a magnitude and/or a phase of the forward traveling signal and the reverse traveling signal of the transmitter signal. The forward traveling signal may include a portion of the transmitter signal from the transmitter of the transceiver 30 to the antenna 74 while the reverse traveling signal may include a portion of the transmitter signal that is reflected back from the antenna 74 towards the transmitter. The VSWR measures how efficiently power is transmitted from a power source, through a transmission line, and into a load (e.g., from a power amplifier, through a transmission line, and to an antenna). As such, a lower VSWR corresponds to a well-matched antenna and transmission line (e.g., VSWR of 1.0 that corresponds to no power reflected from the antenna).

In some embodiments, the transceiver 30 may also communicate a serial signal in a standard protocol (e.g., a transceiver (XCVR) radio frequency front end (RFFE) serial signal (XCVR_RFFE0)) to the coupler 57 to facilitate in measuring the reflection coefficient parameters using the multifunctional tuner, sample at least some of the reflection coefficient parameters, and/or sample other wireless communication parameters. For example, the serial signal may control the coupler 57 that may include a switch to allow the multifunctional tuner to sample the forward traveling signal and the reverse traveling signal. In particular, the serial signal may cause the switch to be in a position enabling a forward path to sample the forward traveling signal or to be in a position enabling a reverse path to sample the reverse traveling signal to facilitate in measuring the reflection coefficient parameters.

As previously discussed, the ratio of the forward traveling signal to the reverse traveling signal represents the reflection coefficient (e.g., S11, FIG. 7). Briefly, the reflection coefficient may indicate an amount of an electromagnetic wave (e.g., transmitter signal) that is reflected by an impedance discontinuity or mismatch in a transmission medium. Specifically, when the transmitter signal travels on a transmission line (e.g., wire or cable to conduct alternating current of radio frequency) from the transmitter to the antenna 74 (e.g. forward traveling signal), the impedance in the transmission line may be different than the impedance of the antenna 74, resulting in the mismatch. The mismatch may cause at least some of the transmitter signal to reflect back in the opposite direction (e.g., reverse traveling signal) away from the antenna 74. That is, when the impedance of the antenna 74 does not exactly match the impedance of the transmission line, signal reflection may occur and at least some of the power that the transmitter of the transceiver 30 is sending to the antenna 74 may be reflected back. As such, the transmitter signal may not transmit at the intended power level, such as within a predefined power level to provide an expected quality for wireless communications.

However, tuning the impedance of the antenna 74 may compensate for the mismatch and deliver the transmitter signal at the predefined power level. Tuning may refer to a network of variable inductors and capacitors that may be altered to counterbalance effects of inductive and capacitive elements of the antenna 74 to provide a resistive load of the threshold impedance (e.g., 50 ohms). In this manner, the wireless communications may continue at the expected quality, such as communications without perceivable interference.

In some embodiments, the transceiver 30 may also determine whether each antenna 74 is active (e.g., configured to transmit a wireless signal) when the radio frequency integrated circuit 50 includes multiple antennas 74 that may transmit and/or receive signals. The transceiver 30 may also detect the precise time at which the transmitter signal is to be transmitted, is transmitting, and/or completes transmission from the antenna 74. Moreover, the transceiver 30 may determine when the transmitter signal is transmitting at a stable power, such that power level variations between successive time intervals may be within a predefined threshold. Once the transmitter signal is stable, the transceiver 30 may send a control signal to the multifunctional tuner 34 to measure the forward traveling signal and the reverse traveling signal.

In some embodiments, in which the transceiver 30 sends a signal to tune the antenna 74 without determining the antenna impedance, the transceiver 30 may communicate with the tuner hub 58 (e.g., the first tuner hub 58A) to initiate tuning the antenna 74 using the multifunctional tuner 32 in a respective transmitter chain 76. Specifically, tuner hub 58 may function as a translating device that translates tuning signals in a standard protocol (e.g., Mobile Industry Processor Interface Alliance (MIPI) RFFE) from the transceiver 30 to a different protocol (e.g., proprietary format, I2C bus, I3C bus, MIPI Virtual general purpose input/output (GPIO) Interface (VGI)) that is compatible with the multifunctional tuner 32. Additionally or alternatively, the tuner hub 58 may convert the standard protocol signal (e.g., RFFE signal) into multiple standard protocol signals (e.g., RFFE sub-signals). As such, the tuner hub 58 may communicate with the transceiver 30 and/or the multifunctional tuner 32 to provide compatible communication between the transceiver 30 and the multifunctional tuner 32. In some embodiments, the transceiver 30 may directly communicate the tuning signal in the proprietary format and/or the multifunctional tuner 32 may process standard format signals without using an intermediary (e.g., the tuner hub 58). Thus, in such embodiments, the radio frequency integrated circuit 50 may not include the tuner hub 58 (as indicated by the dashed line boxes).

In other embodiments, in which the antenna 74 is tuned based on an antenna impedance, the transceiver 30 may send the reflection coefficient parameter measurements to the baseband controller 52 to determine the reflection coefficient. As shown, the baseband controller 52 (e.g., a network controller) and/or the transceiver 30 may include one or more processors 54 (e.g., the processor 12 illustrated in FIG. 1) and one or more memory and/or storage devices 56 (e.g., the memory 14 and/or the nonvolatile storage 16 device illustrated in FIG. 1). The one or more processors 54 may include multiple microprocessors, one or more "general-purpose" microprocessors, one or more special-purpose microprocessors, and/or one or more application specific integrated circuits (ASICs), or some combination thereof. For example, the one or more processors 54 may include one or more reduced instruction set (RISC) processors. The one or more processors 54 (e.g., microprocessors) of the baseband controller 52 may execute software programs and/or instructions to determine impedance of the antenna 74 based on the reflection coefficient parameters, determine whether the impedance is within the threshold impedance, determine power associated with the measured impedance of the antenna 74, determine a tuning state, and so forth. In some embodiments, the transceiver 30 may additionally or alternatively include one or more processors (e.g., such as the one or more processors 54 of the baseband controller 52), which may execute software programs and/or instructions to determine whether the transmitter signal is stable to subsequently send a command signal to the multifunctional tuner 32 to measure the reflection coefficient parameters.

The one or more memory devices 56 may store information such as control software, configuration data, tuning states, look up indexes (e.g., including a threshold impedance and/or threshold impedance range), etc. In some embodiments, the one or more processors 54 and/or the one or more memory devices 56 may be external to the baseband controller 52 and/or the radio frequency integrated circuit 50. The one or more memory devices 56 may include a tangible, non-transitory, machine-readable-medium, such as a volatile memory (e.g., a random access memory (RAM)) and/or a nonvolatile memory (e.g., a read-only memory (ROM)). The one or more memory devices 56 may store a variety of information and may be used for various purposes. For example, the one or more memory devices 56 may store machine-readable and/or processor-executable instructions (e.g., software or software) for the one or more processors 54 to execute, such as instructions for determining the reflection coefficient based on the received measurements of the reflection coefficient parameters, impedance for the transmission line and/or the antenna 74, whether the antenna impedance is within the threshold impedance, the amount of tuning and/or particular tuning state to implement, and so on. The one or more memory devices 56 may include one or more storage devices (e.g., nonvolatile storage devices) that may include read-only memory (ROM), flash memory, a hard drive, or any other suitable optical, magnetic, or solid-state storage medium, or a combination thereof.

Similar to the transceiver 30, the baseband controller 52 may communicate with the tuner hub 58 to initiate tuning the antenna 74 using the multifunctional tuner 32 in the respective transmitter chain 76 after determining the antenna impedance. As depicted, the baseband controller 52 may send a serial signal in a standard protocol to the tuner hub 58 (e.g., a first baseband radio frequency front end serial signal ((BB_RFFE1) to the first tuner hub 58A and/or a second baseband radio frequency front end serial signal ((BB_RFFE2)) to the second tuner hub 58B)) to initiate tuning the antenna 74 using the multifunctional tuner 32. The tuner hub 58 may translate the standard protocol signal(s) (e.g., RFFE signals) to a different format (e.g., a proprietary format, I2C bus, I3C bus, and/or MIPI Virtual GPIO Interface (VGI)) that is compatible with the multifunctional tuner 32. As such, the tuner hub 58 may communicate with the transceiver 30, the baseband controller 52, and/or the multifunctional tuner 32. Specifically, the tuner hub 58 may provide compatible communication between the baseband controller 52 and the multifunctional tuner 32 and/or between the transceiver 30 and the multifunctional tuner 32.

In some embodiments, the baseband controller 52 may directly communicate the tuning signal in the proprietary format and/or the multifunctional tuner 32 may process the standard format signal without using an intermediary (e.g., the tuner hub 58). As such, and as previously discussed, the radio frequency integrated circuit 50 may not include the tuner hub 58 (as indicated by the dashed line boxes). When directly communicating the tuning signal in the radio frequency front end serial signal format, the baseband controller 52 may use at least three lines or wires to communicate a reference voltage signal, a clock signal, and a data signal as part of the tuning signal. On the other hand, the tuner hub 58 may translate the tuning signal to the compatible format (e.g., a reformatted signal in a proprietary format), which may only use one line or wire. Thus, using the tuner hub 58 may reduce the number of wires to communicate the tuning signal and allow for faster data communication.

In some embodiments, the radio frequency integrated circuit 50 may not include the coupler 57 (as indicated by the dashed line box). Such embodiments may include embodiments in which the transceiver 30 may not measure other wireless communication parameters and/or facilitate measuring the reflection coefficients. In such embodiments, the multifunctional tuner 32 may both measure the impedance of the antenna 74 and correspondingly tune the antenna 74, and thus, provide multiple functions. Since the multifunctional tuner 32 is coupled to the antenna 74, and thus, located on the same antenna reference plane, the multifunctional tuner 32 may accurately measure the reflection coefficient parameters (e.g., the magnitude and/or phase of the forward traveling signal and the reverse traveling signal). In contrast, embodiments utilizing the coupler 57, which may be located on a different reference plane than the antenna 74, to measure the reflection coefficient parameters, may result in inaccurate measurements.

Specifically, the coupler 57 may reside on a main logic board reference plane that is separate and/or physically distant from the antenna reference plane with the antenna 74. Furthermore, the main logic board reference plane and the antenna reference plane may be separated by radio frequency and/or other device 10 circuitry. By the time the coupler 57 measures the reflection coefficient parameters, including the forward traveling signal and the reverse traveling signal, the signals' characteristics may change (e.g., from the values of reflection coefficient parameters at the antenna 74). Thus, the measurements may not be a direct translation of antenna 74 performance. As such, using the multifunctional tuner 32 described herein that resides on the same reference plane as the antenna 74 to perform both the impedance determination in addition to the tuning determination, may provide a relatively more precise determination for both.

However, and as previously mentioned, a single function tuner may be used in addition to or as an alternative to the multifunctional tuner 32. For example, the radio frequency integrated circuit 50 may use a single function tuner (e.g., in place of the multifunctional tuner 32) for tuning the antenna 74, but not for measuring impedance. In such embodiments, the radio frequency integrated circuit 50 may not include the tuner hub 58 that translates the tuning signal based on the impedance measurements, since the single function tuner may not perform or use impedance measurements. By way of example, the radio frequency integrated circuit 50 may include the single function tuner for antennas that are less susceptible to impedance changes, and thus, may not utilize impedance measuring to cycle through multiple tuning states. In some embodiments, such as the radio frequency integrated circuit 50 having multiple antennas 74, a combination of both single function tuners and/or multifunction tuners may be used for the various antennas 74 depending on the device design and functionalities (e.g., perform impedance measuring and/or tuning at the particular antenna 74).

Figure 8:
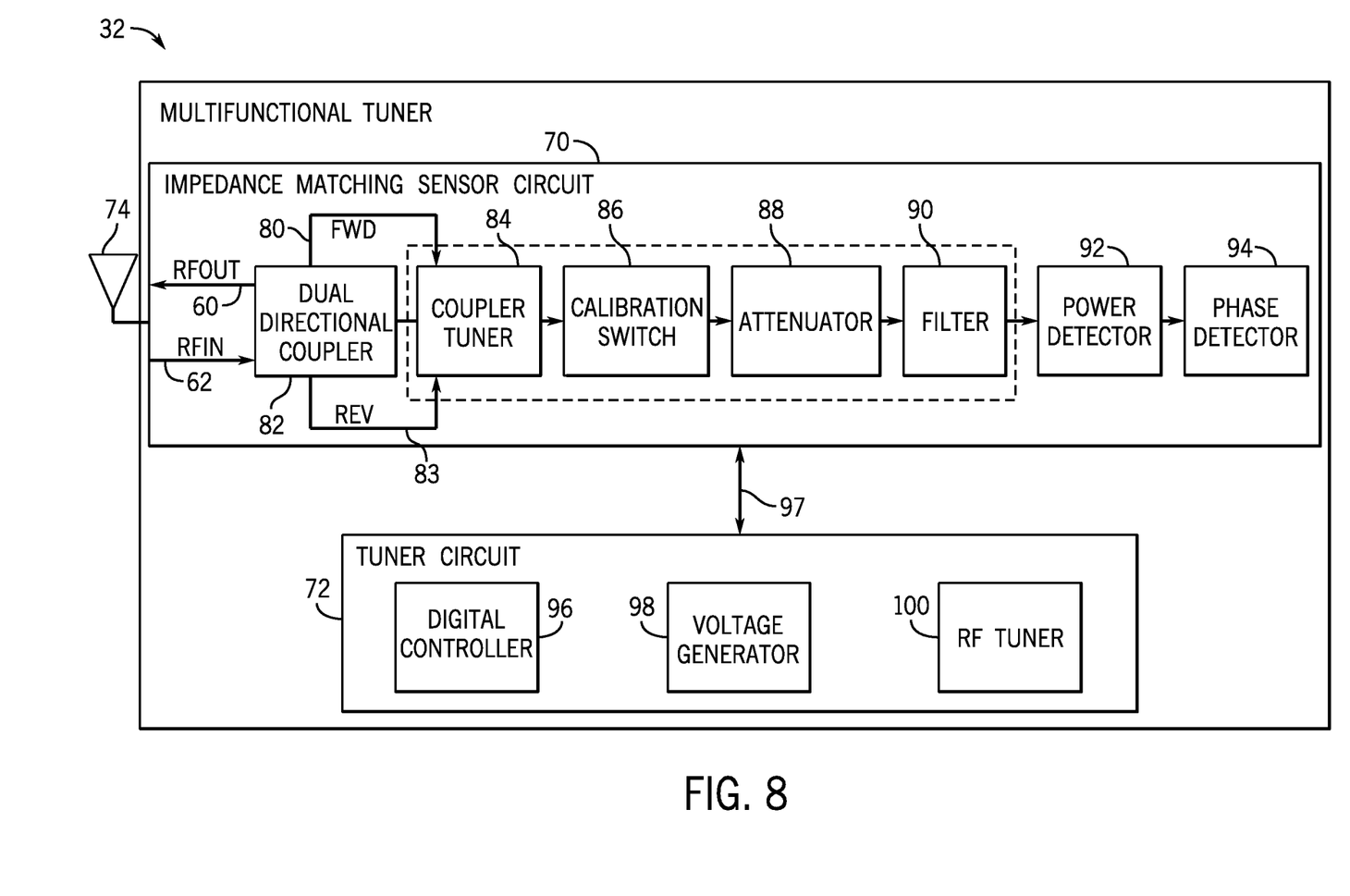
FIG. 8 is a block diagram of a multifunctional tuner of the radio frequency integrated circuit of FIG. 7, according to embodiments of the present disclosure.

As previously discussed, the multifunctional tuner 32 that resides on the same reference plane as the antenna 74 may both accurately measure impedance and tune impedance at the antenna 74. To illustrate, FIG. 8 is a block diagram of the multifunctional tuner 32, according to embodiments of the present disclosure. As shown, the multifunctional tuner may include two portions, an impedance matching sensor circuit 70 and a tuner circuit 72. The impedance matching sensor circuit 70 may measure impedance measurements of the antenna 74 and the tuner circuit 72 may tune the antenna 74 accordingly. The impedance matching sensor circuit 70 may include a dual directional coupler 82, a power detector 92, and/or a phase detector 94. The impedance matching sensor circuit 70 may optionally include (as indicated by the dashed line box) a coupler tuner 84, a calibration switch 86, an attenuator 88, and/or a filter 90. The optional components may enable the dual directional coupler 82 to measure the reflection coefficient parameters more precisely.

As depicted, the multifunctional tuner 32 may receive a receiver signal 62 (RFIN) and/or the transmitter signal 60 (RFOUT) from the antenna 74. The receiver signal 62 may refer to a signal received at the electronic device 10 from an external device, and the transmitter signal 60 may refer to a signal transmitted from the electronic device 10 to an external device. As the transmitter signal 60 is transmitting, the multifunctional tuner 32 may measure the reflection coefficient parameters at the dual directional coupler 82, including the forward traveling signal 80 and the reverse traveling signal 83. These reflection coefficient parameters may be used to determine the reflection coefficient, which indicates the impedance of the antenna 74. As previously discussed, the antenna impedance may indicate output power for the antenna 74 to transmit the transmitter signal 60. In particular, the reflection coefficient may be inversely related to the output power of the antenna 74. As such, a low reflection coefficient/impedance may correspond to a high power level that provides an expected wireless communications performance (e.g., without perceivable interference). Depending on the measured impedance, the multifunctional tuner 32 may tune the antenna 74 more or less so that the impedance is closer to the threshold impedance (e.g., 50 ohms) associated with the expected performance.

In embodiments including the optional coupler tuner 84, the coupler tuner 84 may adjust directivity of the dual directional coupler 82. The dual directional coupler 82 may include a device that couples or diverts a defined amount of electromagnetic power in the transmission line to another transmission line, in either the forward or the reverse direction. In some embodiments, the dual directional coupler 82 may include multiple couplers that are internally connected to provide measurements of both the forward traveling signal 80 and reverse traveling signal 83 in parallel (e.g., approximately simultaneously). That is, a first internally connected coupler of the dual directional coupler 82 may detect measurements of the forward traveling signal 80, while, in parallel, a second internally connected coupler of the dual directional coupler 82 may detect measurements of the reverse traveling signal 83. Directivity may refer to a measure of isolation and routing by the dual directional coupler 82 of the two opposite traveling forward traveling signal 80 and reverse traveling signal 83. The measurements of the reflection coefficient parameters are dependent on the dual directional coupler 82, and thus, subsequent tuning is also dependent on the measurements of these reflection coefficient parameters. The multifunctional tuner 32 may control the coupler tuner 84 to tune the directivity of the dual directional coupler 82, such that tuning increases isolation of the forward traveling signal 80 and the reverse traveling signal 83 to allow for more precise measurements.

In embodiments including the optional calibration switch 86, the attenuator 88, and/or the filter 90, the calibration switch 86 may program the dual directional coupler 82 by enabling one or more programmable switches (e.g., of each of its multiple couplers). The programmable switches may be programmed to switch between measuring for either the forward traveling signal 80 or the reverse traveling signal 83 that are traveling approximately simultaneously. In this manner, the dual directional coupler 82 may precisely isolate the forward traveling signal 80 from the reverse traveling signal 83 for accurate measurements of each in parallel. The attenuator 88 may provide gain control of the forward traveling signal 80 and/or reverse traveling signal 83, such that the power detector 92 may properly measure power and/or gain of these signals. By way of example, when the power associated with the forward traveling signal 80 and/or reverse traveling signal 83 are greater than a dynamic range of power detection of the power detector 92, the attenuator 88 may apply a corresponding amount of attenuation to the signals for the power detector 92 to process the signals. Furthermore, the filter 90 may include one or more low pass and/or high pass filters to remove out-of-band frequencies, reducing or eliminating inference from other signals.

The multifunctional tuner 32 may process the forward traveling signal 80 and the reverse traveling signal 83 through the power detector 92. The power detector 92 may include one or more power detector devices to detect the magnitude (e.g., power level) of the signals. The magnitude of the signals may indicate that the power level for transmitting the transmitter signal 60 is too high or low, and the multifunctional tuner 32 may tune the antenna 74 accordingly. By way of example, the multifunctional tuner 32 may tune the antenna 74 to have a lower impedance when the magnitude indicates a low power level to increase the power level and transmit the transmitter signal 60, and vice versa. Moreover, the power detector 92 may detect radio frequency pulses, which may indicate transmission of the transmitter signal 60. In some embodiments, this may cause the multifunctional tuner 32 to automatically perform measurements of the reflection coefficient parameters.

Furthermore, the multifunctional tuner 32 may process the forward traveling signal 80 and the reverse traveling signal 83 through the phase detector 94. The phase detector 94 may include one or more phase detectors 94 to detect the phase of the signals. Specifically, the phase detector 94 may sample the voltages of the forward traveling signal 80 and the reverse traveling signal 83 and the current flowing to the antenna 74, indicating whether the antenna 74 is in-phase or out-of-phase with the forward traveling signal 80 and reverse traveling signal 83. If the antenna 74 is out-of-phase, the multifunctional tuner 32 may tune the antenna to be in-phase with the signals.

In some embodiments, the multifunctional tuner 32 may include two power detectors 92 and two phase detectors 94 to process the forward traveling signal 80 and the reverse traveling signal 83. That is, one of the power detectors 92 and one of the phase detectors 94 may process the forward traveling signal 80 while the other power detector 92 and the other phase detector processes the reverse traveling signal 83. In this manner, the multifunctional tuner 32 may not delay processing each of these signals, allowing for accurate and quick power and phase detection measurements to estimate the antenna impedance. In some embodiments, the multifunctional tuner 32 may store the magnitude and phase determinations of the forward traveling signal 80 and the reverse traveling signal 83 in an internal register.

After the multifunctional tuner 32 measures the reflection coefficient parameters via the impedance matching sensor circuit 70, the multifunctional tuner 32 may correspondingly adjust the antenna 74 using the tuner circuit 72. As shown, the tuner circuit 72 may include a digital controller 96, a voltage generator 98, and a radio frequency tuner 100. The impedance matching sensor circuit 70 may communicate data, such as magnitude and phase estimations of the forward traveling signal 80 and the reverse traveling signal 83, to the tuner circuit 72 via an internal control bus 97 (e.g., cables and/or wires). Upon receiving this data, the digital controller 96 may communicate the data to the baseband controller 52 of FIG. 7 to determine the reflection coefficient.

In particular, the digital controller 96 may receive the reflection coefficient parameters, including the forward traveling signal 80 and the reverse traveling signal 83, as soon as the impedance matching sensor circuit 70 performs the measurements. The baseband controller 52 may use these measurements to determine a tuning state. As discussed with respect to FIG. 7, the baseband controller 52 and/or the transceiver 30 may command the multifunctional tuner 32 (e.g., the digital controller 96) to tune the antenna 74. As will be described in detail with respect to FIG. 9, the digital controller 96 may tune the antenna 74 using the radio frequency tuner 100 to a tuning state among multiple tuning states (e.g., one of four predefined tuning states). When tuning, one or more characteristics of the antenna 74 may be adjusted. Specifically, the radio frequency tuner 100 may adjust a matching network and/or radiation performance of the antenna 74. Improving either or both may reduce the reflection coefficient and thus, increase power of the transmitter signal 60. Moreover, the voltage generator 98 may provide a voltage to enter the transmission line from the transmitter (e.g., source) to the antenna 74 (e.g., load) when transmitting the transmitter signal 60. Based on the power loss indicated by the antenna impedance, the multifunctional tuner 32 may tune the antenna 74 so that approximately the same power is transferred when the signal reaches the antenna 74, compensating for the power loss.

Figure 9:
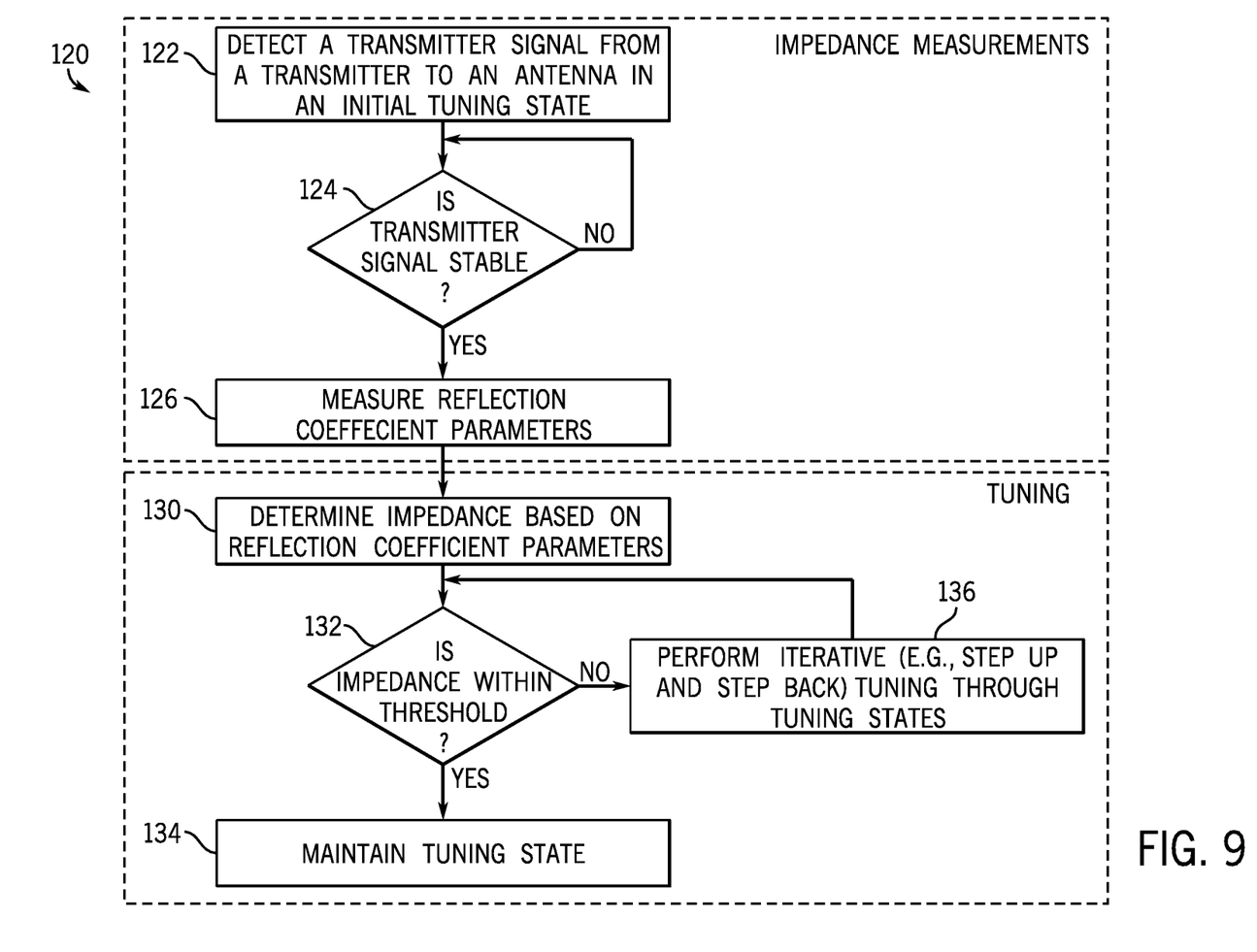
FIG. 9 is a flowchart illustrating a method for measuring antenna impedance and tuning the antenna using the multifunctional tuner, according to embodiments of the present disclosure.

To illustrate measuring the antenna impedance and using the measurement to determine whether to tune the antenna 74, FIG. 9 is a flowchart of a method for antenna tuning 120 according to embodiments of the present disclosure. A portion (as indicated by a dashed line box) of the antenna tuning 120 may include measuring impedance of the antenna 74 and a second portion (as indicated by a second dashed line box) of the antenna tuning 120 may include tuning parameters of the antenna 74.

Any suitable device that may control components of the radio frequency integrated circuit 50, such as the multifunctional tuner 32 and/or the transceiver 30, may perform the first portion of the antenna tuning 120 (e.g., measuring impedance). On the other hand, any suitable device that may control components of the radio frequency integrated circuit 50, such as the baseband controller 52 and/or the multifunctional tuner 32, may perform the second portion of the antenna tuning 120 (e.g., tuning the antenna 74). While the antenna tuning 120 is described using steps in a specific sequence, it should be understood that the present disclosure contemplates that the described steps may be performed in different sequences than the sequence illustrated, and certain described steps may be skipped or not performed altogether. In some embodiments, the antenna tuning 120 may be implemented by executing instructions stored in a tangible, non-transitory, computer-readable medium, such as the one or more memory devices 56, using a processor, such as the one or more processors 54. The processor 54 of the electronic device 10 may include instructions to perform the tests that are stored (e.g., in memory 56) and carried out by the electronic device 10.

As illustrated, the processor 54 (e.g., of the transceiver 30) may detect (process block 122) the transmitter signal 60 from the transmitter to the antenna 74 in an initial tuning state. In some embodiments, the initial tuning state may be a user defined and/or a default tuning state (e.g., no tuning) for the antenna 74. After the transmitter signal 60 is transmitted, the processor 54 may determine whether (decision block 124) the transmitter signal 60 is stable, using the techniques previously described. For example, a stable transmitter signal may refer to power level variations of the transmitter signal 60 between successive time intervals to be within a predefined threshold. Since the transceiver 30 sends the transmitter signal 60 to the antenna 74, the processor 54 may have access to timing information for the transmitter signal 60 and/or may determine when the transmitter signal 60 becomes stable. If the transmitter signal 60 is not stable, the processor 54 may continue determining whether the transmitter signal 60 is stable until the signal is determined to be stable.

Once the transmitter signal 60 is stable, the processor 54 may measure (process block 126) the reflection coefficient parameters. Measuring the reflection coefficient parameters may include measuring the magnitude and/or phase of the forward traveling signal 80 and the reverse traveling signal 83. As previously discussed, measuring the reflection coefficients at a coupler or another component residing on a reference plane different than the antenna reference plane, in which the planes may be separated by additional circuitry and/or wires, may result in measuring the reflection coefficient parameters with a delay or less precision than if the measurements are taken on the antenna reference plane.

Accordingly, the processor 54 may measure the reflection coefficient parameters using the multifunctional tuner 32 that resides on the antenna reference plane, using the techniques previously described (e.g., the impedance matching sensor circuit of FIG. 8). Once the transmitter signal 60 stabilizes, the multifunctional tuner 32 may receive a signal from the processor 54 of transceiver 30 to measure the reflection coefficient parameters. Since the multifunctional tuner 32 and the antenna 74 reside on the same reference plane, the measurements by the multifunctional tuner 32 may be more precise than the measurements taken at a coupler on a different reference plane (e.g., the coupler 57 of FIG. 7). In some embodiments, the multifunctional tuner 32 may store these measurements in the internal register of the multifunctional tuner 32.

In other embodiments, the multifunctional tuner 32 may automatically detect the radio frequency pulse, which may indicate that the transmitter signal 60 is transmitting. As such, the multifunctional tuner 32 may measure the reflection coefficient parameters without waiting for the transceiver 30 to send it a signal or indication that the transmitter signal 60 is transmitting. However, in some embodiments, the multifunctional tuner 32 may wait for the transceiver 30 to send a signal indicating that the transmitter signal 60 is stable before measuring the reflection coefficient parameters and subsequently storing them in the internal register.

After the processor 54 completes the reflection coefficient measurements (e.g., process blocks 122, 124, and 126) of the antenna tuning 120 process, the processor 54 may perform the tuning of the antenna tuning 120 process. Specifically, after receiving the reflection coefficient measurements, the processor 54 (e.g., of the baseband controller 52) may determine (process block 130) the antenna impedance based on the reflection coefficient parameters. The processor 54 of the transceiver 30 may retrieve (e.g., via a read command) the measurement data from the register of the multifunctional tuner 32. The processor 54 may then communicate this data to the baseband controller 52 to determine the antenna impedance. Alternatively, the processor 54 of the baseband controller 52 may retrieve the measurement data from the internal register of the multifunctional tuner 32 to determine the antenna impedance.

As previously mentioned, the multifunctional tuner 32 may monitor the transmitter signal 60 by a radio frequency pulse using its power detector 92. The multifunctional tuner 32 may set a flag in its register (or some other indication) when it detects the transmitter signal 60 via the radio frequency pulse. The baseband controller 52 may poll the register and trigger the multifunctional tuner 32 to perform reflection coefficient measurements (e.g., process block 126) when the flag is set. In some embodiments, the same or different flag may be set after the multifunctional tuner 32 measures the reflection coefficient parameters. Using this flag as an indication that the measurements are available, the processor 54 (e.g., of the transceiver 30 and/or baseband controller) may retrieve the reflection coefficient measurements from the internal register of the multifunctional tuner 32.

As previously discussed, the ratio of the reflection coefficient parameters, which include the forward traveling signal 80 and the reverse traveling signal 83, may provide the reflection coefficient. The reflection coefficient may indicate the impedance of the antenna 74 and whether an expected amount of power was applied to the transmitter signal 60 to provide wireless communications without perceivable interference. Thus, the processor 54 of the baseband controller 52 may determine whether (decision block 132) the impedance is within the threshold impedance (e.g., threshold value and/or threshold range). For example, the threshold impedance may include 50 ohms. If the antenna impedance is within the threshold, then the processor 54 may maintain (process block 134) the present tuning state.

On the other hand, if the antenna impedance is not within the threshold, then the processor 54 of the baseband controller 52 may perform (process block 136) iterative tuning through tuning states. Iterative tuning may refer to the processor 54 stepping up and/or stepping down through the tuning states to determine a tuning state having a measured antenna impedance that deviates less from the threshold impedance compared to measured antenna impedances of a preceding tuning state and/or a subsequent tuning state. The processor 54 may then use the determined tuning state to transmit the transmitter signal 60.

The processor 54 may tune the antenna 74 to a different tuning state by sending a control signal through the tuner hub 58 to the multifunctional tuner 32, as previously described. The tuning states may be associated with a tuning amount for the particular device and/or device condition, such as for an indoor and/or outdoor condition, the enclosure (e.g., cover) or type of enclosure (e.g., based on shape, dimension, material), and/or a manner of usage (e.g., a hand covering a portion of the antenna 74 of the device 10). Moreover, the tuning may be adaptive since determining the tuning state is done in real time as the device is used in different manners.

Tuning the antenna 74 increases or decreases the impedance of the antenna 74 to bring it closer to the threshold antenna impedance. As such, the tuning states described herein are used to increase or decrease the antenna impedance so that it is closer to the threshold impedance. That is, if the determined antenna impedance (e.g., based on the reflection coefficient) is less than the threshold impedance, then the processor 54 may increase the antenna impedance using one or more tuning states to more closely match and/or match the threshold impedance. On the other hand, if the measurement antenna impedance is greater than the threshold impedance, then the processor 54 may decrease the antenna impedance using one or more tuning states to more closely match and/or match the threshold impedance.

Although the following discussions describe four tuning states, which represents a particular embodiment, it should be appreciated that the systems and methods described herein may be performed with one or more (e.g., one, four, twenty, one hundred, and so forth) tuning states. By way of example, a first tuning state may provide a tuning for when the antenna 74 is completely uncovered, a second tuning state may provide a tuning for when the antenna 74 is partially covered (e.g., less than half of the antenna), a third state may provide a tuning for when the antenna 74 is heavily covered (e.g., more than half of the antenna 74), a fourth tuning state may provide a tuning amount for when the antenna 74 is completely covered, and so forth. Thus, if the measured impedance is below the threshold impedance due to the antenna being completely covered, tuning the antenna to the fourth tuning state may adjust antenna parameters so that the impedance is within the threshold impedance, indicating that the antenna is transmitting the transmitter signal with ample power (e.g., within predefined power threshold) to provide wireless communications as expected.

As previously mentioned, the tuning may be performed iteratively. That is, the processor 54 may tune the antenna 74 from its initial state to a first state and then to a second state. After tuning to the second state, the processor 54 may determine whether the impedance is within the threshold impedance. The processor 54 may continue cycling (e.g., tune to the third state, the fourth state, and so forth) through the tuning states until the impedance is within the threshold impedance. Once the impedance is within the threshold impedance, then the processor 54 may maintain the tuning state.

However, after tuning to the subsequent tuning state, the impedance may increase and/or deviate from the threshold impedance more than the preceding tuning state. In such instances, the processor 54 may step back in the tuning cycle (e.g., tune back to the previous state). That is, the processor 54 may iteratively step up (e.g., from initial state to the first state, and then to the second state, etc.) and then step back down (e.g., from the second state to the first state) when the measured impedance deviates further from the threshold impedance. In some embodiments, the processor 54 may be programmed to iteratively cycle through the tuning cycles in sequence. Additionally or alternatively, the baseband controller 52 may be programmed to cycle through the tuning cycles out of order or at random. That is, the baseband controller 52 may skip some states when iteratively tuning the antenna 74.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ," it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:
1. Transceiver circuitry comprising:
an antenna directly coupled to a first printed circuit board (PCB) and configured to transmit radio frequency signals based on analog electrical signals;
radio frequency front end circuitry disposed on a second PCB and configured to output the analog electrical signals;

a transmission line configured to electrically couple the antenna and the radio frequency front end circuitry; and
tuner circuitry disposed on the first PCB and configured to set a tuning state of the antenna based on an antenna impedance, wherein the tuning state is associated with a device condition, wherein the device condition comprises an indoor condition or an outdoor condition, the tuner circuitry comprising;
measurement circuitry electrically coupled to the antenna via coupler circuitry, the measurement circuitry configured to measure one or more waveform properties of a forward traveling signal to the antenna and a reflected signal corresponding to the forward traveling signal from the antenna, the coupler circuitry comprising a coupler disposed on the first PCB, and
impedance determining circuitry configured to determine the antenna impedance based on the one or more waveform properties.

2. The transceiver circuitry of claim 1, wherein the tuner circuitry is configured to adjust the antenna impedance of the antenna to match an output impedance of the transceiver circuitry based on the one or more waveform properties.

3. The transceiver circuitry of claim 1, wherein the output impedance comprises a transmission line impedance of the transmission line configured to couple the radio frequency front end circuitry disposed on the second PCB to the antenna.

4. The transceiver circuitry of claim 2, wherein the tuner circuitry is configured to adjust the tuning state of the tuner circuitry based on the antenna impedance relative to one or more impedance thresholds.

5. The transceiver circuitry of claim 4, wherein setting the tuning state of the tuner circuitry comprises stepping through a plurality of tuning states of the tuner circuitry until the antenna impedance is within the one or more impedance thresholds.

6. The transceiver circuitry of claim 1, wherein the impedance determining circuitry is a baseband processor.

7. The transceiver circuitry of claim 1, wherein the one or more waveform properties comprise a first magnitude of the forward traveling signal and a second magnitude of the reflected signal, a first phase of the forward traveling signal and a second phase of the reflected signal, or the first magnitude, the second magnitude, the first phase, and the second phase.

8. The transceiver circuitry of claim 1, wherein the one or more waveform properties comprise a voltage standing wave ratio.

9. The transceiver circuitry of claim 1, wherein the coupler circuitry comprises a dual directional coupler.

10. The transceiver circuitry of claim 1, wherein the device condition comprises one or more conditions of a set of conditions comprising the indoor condition, the outdoor condition, an enclosure type, an enclosure shape, an enclosure covering, and a user hand position relative to the antenna.

11. The transceiver circuitry of claim 1, wherein the coupler circuitry is configured to isolate the forward traveling signal from the reflected signal for measurement in parallel.

12. A method comprising:
generating, via radio frequency front end circuitry disposed on a first printed circuit board (PCB), a forward signal;
measuring, via a coupler of measurement circuitry of tuner circuitry disposed on a second PCB, one or more waveform parameters associated with the forward signal traveling from the radio frequency front end circuitry to an antenna disposed on the second PCB and a reverse signal, corresponding to a reflection of the forward signal, traveling from the antenna, wherein a transmission line is configured to electrically couple the antenna and the radio frequency front end circuitry;
determining, via impedance determining circuitry of the tuner circuitry disposed on the second PCB, a current value indicative of an antenna impedance of the antenna based on the one or more waveform parameters; and
adjusting, via the tuner circuitry disposed on the second PCB, the antenna impedance based on the current value.

13. The method of claim 12, wherein the coupler comprises a dual directional coupler configured to provide the forward signal and the reverse signal in parallel for measuring the one or more waveform parameters.

14. The method of claim 12, wherein the one or more waveform parameters comprise a reflection coefficient associated with the antenna.

15. The method of claim 12, comprising:
sequentially stepping through one or more tuning states of a plurality of tuning states until a first deviation of a first impedance associated with a current tuning state of the plurality of tuning states from a threshold impedance range is greater than a second deviation of a second impedance associated with a preceding tuning state of the plurality of tuning states from the threshold impedance range; and
selecting the preceding tuning state.

16. The method of claim 15, wherein the threshold impedance range is based on an output impedance of the transmission line from the radio frequency front end circuitry to the antenna.

17. The method of claim 12, wherein adjusting the antenna impedance based on the current value comprises matching the antenna impedance with a transmission line impedance of the transmission line.

18. A radio frequency electronic device comprising:
an antenna disposed on a first printed circuit board (PCB) and configured to transmit radio frequency signals based on analog electrical signals;
radio frequency front end circuitry disposed on a second PCB and configured to output the analog electrical signals;
a transmission line configured to electrically couple the antenna and the radio frequency front end circuitry; and
tuner circuitry disposed on the first PCB and operationally electrically coupled to the antenna via coupler circuitry, the tuner circuitry comprising:
measurement circuitry configured to measure one or more waveform properties of an analog electrical signal of the analog electrical signals and a reflected analog electrical signal, corresponding to a reflection of the analog electrical signal, from the antenna, wherein the coupler circuitry comprises a dual directional coupler disposed on the first PCB; and
impedance determining circuitry configured to determine an antenna impedance based on the one or more waveform properties, wherein the tuner circuitry is configured to adjust the antenna impedance based on the determined antenna impedance.

19. The radio frequency electronic device of claim 18, wherein the tuner circuitry is configured to adjust the antenna impedance of the antenna to match an output impedance of the transmission line at the antenna based on the one or more waveform properties.

20. The radio frequency electronic device of claim 18, wherein the tuner circuitry is configured to adjust the antenna impedance based on the determined antenna impedance by sequentially cycling through a plurality of tuning states until the antenna impedance is within one or more impedance thresholds.

* * * * *